UNITED STATES PATENT OFFICE.

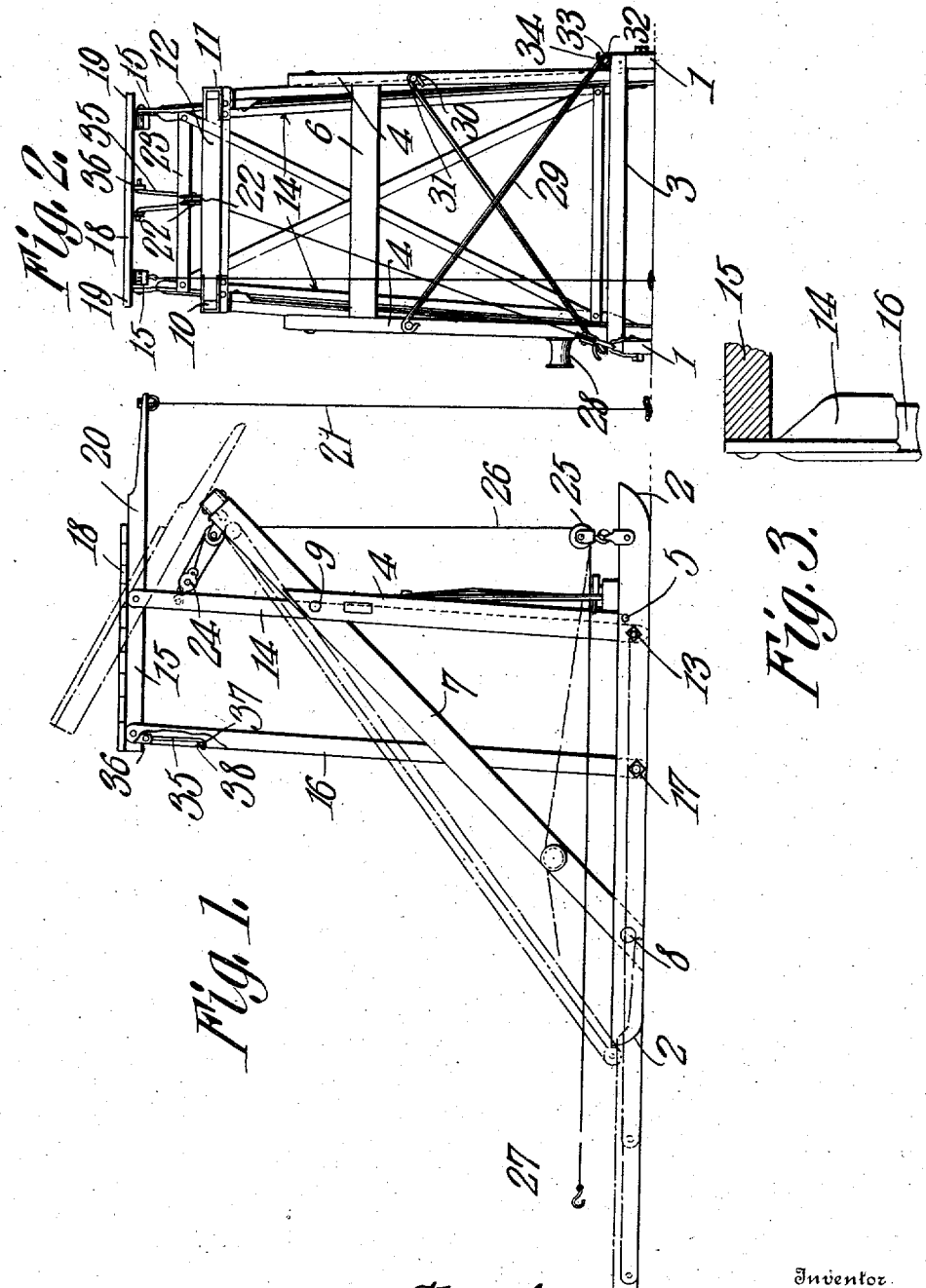

SHERIDAN E. FOWLER, OF WINSLOW, INDIANA, ASSIGNOR OF ONE-THIRD TO CLARENCE ABBOTT AND ONE-THIRD TO ROBERT M. GRAY, OF OTWELL, INDIANA.

HAY-STACKER.

No. 883,633.   Specification of Letters Patent.   Patented March 31, 1908.

Application filed September 25, 1907. Serial No. 394,545.

*To all whom it may concern:*

Be it known that I, SHERIDAN E. FOWLER, a citizen of the United States, residing at Winslow, in the county of Pike and State of Indiana, have invented a new and useful Hay-Stacker, of which the following is a specification.

This invention has reference to improvements in hay stackers, and its object is to provide a portable structure for the purpose which may be readily transported from place to place, or which, if it is to be transported for long distances, may be disassembled and packed into comparatively small compass.

The invention comprises a support made up of two spaced sills, suitably rounded at the ends, with a cross beam joining and spacing the two sills at one end. The sills carry a frame composed of two uprights and a cross beam constituting a support for the upper ends of inclined side beams connected at their lower ends to the sills near the ends of the latter remote from the cross beam. Pivotally connected to the sills about midway of the length of the latter are two spaced elevator frames connected together at the ends remote from those pivoted to the sills by spacing links, so that when these frames are moved about their pivots from a position where they both lie substantially flat upon the ground to a position where they are both substantially upright, said frames will always remain parallel. The upper or free ends of these frames carry a tilting table, pivotally connected to one of the frames only and normally resting upon the links connecting the outer ends of these frames.

Provision is made for the tilting of the table carried by the frames and also for the elevation and lowering of the frames carrying the tilting table, this latter operation being accomplished by suitable tackle which may be actuated by a horse if so desired, thereby lifting the frames with hay deposited on the table to the upright position, from which position the table may be so manipulated as to tilt and deposit its load of hay where desired, or if need be, the table may be locked against tilting so that the hay may be pitched from the table instead of being allowed to gravitate therefrom.

The invention likewise provides a framework so constructed that it may be easily and quickly dismantled and folded up for transportation over long distances, although for short distances the entire structure, without dismantling, may be transported from place to place, using the sills as runners.

The invention will be best understood by reference to the following detailed description, taken in connection with the accompanying drawings forming part of this specification, in which,—

Figure 1 is a side elevation of the improved hay stacker, showing phases of operation in dotted lines; and Fig. 2 is an end elevation of the improved hay stacker. Fig. 3 is a detail view of the upper ends of the uprights.

Referring to the drawings, there are shown two spaced sills 1—1 having both ends 2 rounded as indicated, and near one end these sills are joined by a cross beam 3. Adjacent to the cross beam 3 there are erected on the sills two uprights 4; one on each sill and each connected to its sill by a single bolt or other securing means 5. These uprights are connected near their upper ends by a cross piece 6. At the extreme upper ends of the uprights they are secured to diagonal beams 7, one for each upright, and these diagonal beams are each fast at the lower end by a single bolt or other securing means 8 to the respective sill 1 near the end of the sill remote from its connection with the beam 3. Each diagonal beam 7 projects beyond the point of connection 9 with the upright 4 and at its extreme upper end is formed with a tenon 10 to receive a strap 11 on the corresponding end of and spaced from a connecting strip 12, which latter serves to brace and space the upper ends of the diagonal beams 7, but because of the straps 11 this brace may be readily removed.

Each upright 4 is secured to its corresponding sill 1 by another bolt 13 which also forms the pivotal support for the corresponding lower end of frame 14, which latter is connected at its other end by links 15 to the corresponding end of another similar frame 16 which, in turn, has the ends remote from the connection with the links 15 connected to the sills 1 by pivot bolts 17. The frames 14 and 16 are movable about the pivot bolts 13 and 17 but being connected together, at one end by the sills 1 and at the other end by the links 15, these frames 14 and 16 have a parallel motion about the bolts 13 and 17 as pivots.

Pivotally connected to the end of the frame 14 remote from the pivot bolts 13, and preferably by the same pivotal connections by means of which the links 15 are connected to the frame 14, is a platform 18 having its floor laterally overhanging, as shown at 19, while the sills 20 of the platform are so spaced as to fit between the links 15, the extensions 19 of the floor overhanging these links and acting as stops limiting the movement of the platform about its pivots in one direction. The sills 20 extend beyond the platform on each side of its pivotal support remote from the frame 16, and connected to the end of one of these sills is a rope or strand 21.

The connecting strip 12 about midway of its length carries a double sheave block 22 and attached to a cross piece 23 of the frame 14 is a single sheave block 24. Also carried by one of the sills 1 is a single sheave block 25. A suitable rope 26 is connected to the block 24 and from thence passes around one of the sheaves in the block 22 and returns and passes around the sheave in the block 24 from whence it extends to the other sheave in the block 22 and thence around the sheave in the block 25, and has means, such as a hook 27, at its other end to which a horse may be secured in such manner that by pulling upon the rope 26 the two frames 14 and 16 will be drawn from the horizontal position, shown in dotted lines, Fig. 1, to the upright position, shown in full lines, Fig. 1, and the platform 18 will participate in this movement. The upright portions of the frames 14 and 16 are made of angle iron and the distance between the uprights of the frame 14 is made a little less than that between the uprights of the frame 16, so that when these two frames are folded down to the ground in the position shown in dotted lines, Fig. 1, the frame 14 will nest in the frame 16 and the platform 18 is separated from the ground only by the thickness of the side bars of the frame 16. Now, let it be assumed that the frames 14 and 16, constituting the elevating part of the structure, are in their lowermost position, as shown in Fig. 1; hay may then be easily placed upon the platform 18. The horse attached to the hook 27 is now driven toward the left as viewed in Fig. 1 and the frames 14 and 16 are drawn to the upright position with the hay upon the platform 18, which, because of the location of its pivotal point, is held in contact with the links 15 and so supported. Now, by pulling upon the rope 21, which is long enough to be within reach of a person standing on the ground, the platform 18 is tilted to the position shown in dotted lines, Fig. 1, and the contents of the platform gravitate from the same and fall until arrested by the haymow being formed. Now, by allowing the platform 18 to return to its normal position and by pulling backward upon the rope 21, that is, away from the haymow, the frames 14 and 16 will be slightly inclined toward the lowered position and will tend to gravitate thereto. The lowering of the platform 18 to the ground may be controlled by taking two or three turns of the rope 26 about a stud 28 fast on one of the diagonal beams 7 within reach of a person standing on the ground.

In order to provide for side strains which may occur upon the uprights 4 there are crossed brace rods 29 having hooks 30 formed at their upper ends engaging over pins 31 on the front faces of the uprights 4, and the lower ends of these brace rods are also formed into hooks 32 to receive wedges 33 engaging under hook-shaped plates 34 which may be suitably slotted for the passage of the hooked ends 32 of the rods 29.

Suppose that it is desirable to move the structure from one portion of a field to another. Then all that is necessary is to lower the frames 14 and 16 until they are between the sills 1, but not necessarily upon the ground, in which position they can easily be held by the engagement of the rope 26 about the stud 28, and by attaching a horse to the cross beam 3 the entire structure may be dragged to the desired point. Suppose, however, that it is desirable to transport the device over longer distances. The brace rods 29 are first removed, then the bolts 13 and 17 are taken out, thus disengaging the frames 14 and 16 from the sills 1. At the same time the lower ends of the uprights 4 are loosened from the sills by the removal of the bolts 5, while the diagonals 7 may be removed from the sills by taking out the bolts 8. Then, by removing the cross pieces 6 and 12 the whole structure is dismantled and may be transported or stored away, as the case may be. The structure is such that when it is desired to again set it up this may be done in a very short space of time.

Sometimes it is desirable that the hay be pitched from the platform 18 on to the haymow, and for this reason there is provided a hook 35 depending from the platform 18 at the end adjacent to the frame 16, and this hook may be made with elastic sides so that the outturned ends thereof may snap into eyes 36 on the under side of the platform 18. The hooked end 37 of this hook 35 is arranged to engage under a cross bar 38 on the frame 16 so as to hold the platform from tipping when this is desirable. Under these conditions a man may stand on the platform and pitch the hay therefrom after the platform, with the man and the hay on it, has been elevated. When it is desirable to remove the hook the sides are pressed together and the ends will disengage themselves from the eyes 36.

I claim:—

1. A hay stacker comprising a suitable base, two parallel frames pivoted thereto and movable in a vertical plane, and a platform carried by said frames and overbalanced to normally rest by gravity upon said frames.

2. A hay stacker comprising a suitable base, two parallel frames each pivoted at one end to the base, spacing links connecting the other ends of the frames, and a platform pivoted to said connected end of the frames and overbalanced to normally rest by gravity thereon.

3. A hay stacker comprising a suitable base, two parallel frames pivoted at one end to said base and connected together at the other end, and a pivoted platform carried by said other end of the frames, said frames being constructed to nest one in the other when brought together.

4. A hay stacker comprising a suitable base, two parallel frames pivoted to the base and movable in a vertical plane, said frames also being connected at the ends remote from the pivoted ends, a platform pivoted to one of the frames and overbalanced to normally rest by gravity upon the other frame, and means for moving the platform against the action of gravity to tilt the same.

5. In a hay stacker, a suitable base, a fixed support thereon comprising uprights and a diagonally disposed frame carried thereby, other parallel frames pivotally connected to the base at one end and at the other end connected together by spacing links, a platform pivoted to one of the parallel frames and overbalanced to be normally supported by said frames, means for tilting the platform, and means for moving the parallel frames in a vertical plane.

6. A hay stacker comprising a suitable base composed of two parallel spaced sills united by a cross piece, uprights connected to said sills near one end thereof, diagonal beams connected at one end to the sills at points remote from the end carrying the uprights, said diagonal beams also being connected to the upper ends of the uprights and projecting beyond the same, a removable tie strip connecting the upper ends of the diagonal beams, parallel frames pivotally connected to the sills near the uprights and connected together at the ends remote from those pivoted to the sills by spacing links, an overbalanced platform pivoted to one of the frames and supported by both of said frames, means for tilting the platform against the action of gravity, and means for raising and lowering the pivoted parallel frames, together with the platform, in a vertical plane.

7. In a hay stacker, a pivoted platform for the reception of hay, means for moving the platform through a vertical plane, and a hook for locking the said platform from movement around its pivot, said hook being elastically held to and removable from the platform.

In testimony that I claim the foregoing as my own, I have hereto affixed my signature in the presence of two witnesses.

SHERIDAN E. FOWLER.

Witnesses:
H. W. CARPENTER,
M. S. TRAGUE.